United States Patent [19]

Fisher

[11] Patent Number: 6,016,770
[45] Date of Patent: Jan. 25, 2000

[54] ACCLIMATING SALT-WATER FISH TO BRACKISH OR FRESH WATER

[76] Inventor: Jerold W. Fisher, 1980 Superfine La. #204, Wilmington, Del. 19802

[21] Appl. No.: 09/334,330

[22] Filed: Jun. 16, 1999

[51] Int. Cl.⁷ .................................................. A01K 61/00
[52] U.S. Cl. ............................................................. 119/215
[58] Field of Search ..................................... 119/200, 215, 119/217, 231

[56] References Cited

U.S. PATENT DOCUMENTS

| | | | |
|---|---|---|---|
| 4,034,030 | 7/1977 | Bracey | 261/64 D |
| 5,046,451 | 9/1991 | Inslee et al. | 119/215 |
| 5,893,337 | 4/1999 | Sevic | 119/215 |

FOREIGN PATENT DOCUMENTS

| | | | |
|---|---|---|---|
| 605261 A2 | 12/1992 | European Pat. Off. | |
| 405064530 | 3/1993 | Japan | 119/215 |
| 1824122 | 6/1993 | U.S.S.R. | 119/215 |

*Primary Examiner*—Thomas Price
*Attorney, Agent, or Firm*—Connolly Bove Lodge & Hutz LLP; Frank Z Yang

[57] ABSTRACT

The present invention provides a process for acclimating a salt-water fish that is adaptable to acclimation to brackish or fresh water by initially placing the fish in water having about one half the salt content of its natural habitat, then slowly reducing the salt content to the desired concentration. The invention also provides a salt-water fish that can live in water that contains substantially less salt than its natural habitat. Further, the invention provides an aquarium that contains both a salt-water fish and a fresh-water fish.

9 Claims, No Drawings

ACCLIMATING SALT-WATER FISH TO BRACKISH OR FRESH WATER

BACKGROUND

Fish can be categorized by the water in which they spend their life cycle. Some spend their entire life cycle in salt water (generally marine fish). Herein, salt water is defined as water having a salt content about the same as that of sea water. This disclosure will refer to salt content by specific gravity (e.g., the salt content of sea water is about 1.022). Other fish spend their entire life cycle in fresh water, herein defined as having a salt content of about 1.000 specific gravity. Fresh-water fish can live in water having up to about 1.003 salt content. Some fish can live in brackish water. Although brackish water is generally regarded as water having a salt content of about 1.001 to about 1.003 specific gravity, this disclosure defines brackish water as water that has a salt content between about 1.000 and about 1.022. Fish that live in brackish water can usually also live in fresh or salt water. Still other fish spend part of their life cycle in fresh water and part of their life cycle in salt water (e.g., salmonid).

Heretofore, aquarists can keep salt-water fish only in salt-water aquariums. However, salt-water aquariums present many maintenance problems. Therefore, it is not surprising that the aquarium industry estimates that about 9 out of 10 aquarium hobbyists do not keep salt-water fish despite the fact that salt-water fish often have more decorative colors and shapes than other types of fish. A salt-water fish that can be maintained in either fresh water or brackish water would probably find commercial success.

SUMMARY OF THE INVENTION

The present invention relates to a process for acclimating a salt-water fish that is adaptable to acclimation to water that contains substantially less salt than its natural habitat. The process comprises placing the salt-water fish in water having, by specific gravity, about one half the salt content of its natural habitat, then slowly reducing the salt content to the desired concentration.

The invention also provides a salt-water fish that can live in water that contains substantially less salt than its natural habitat.

DETAILED DESCRIPTION OF THE INVENTION

The natural habitat for salt-water fish generally has a salt content of about 1.022. The process for acclimating a salt-water fish to water that contains substantially less salt than its natural habitat, requires placing the salt-water fish in water having about one half the salt content of its natural habitat. The salt content is then slowly reduced to the desired concentration.

In a preferred embodiment, fish is initially placed in water having a salt content of about 1.012 to about 1.01. The salt content is reduced by increments of about 0.0005 to about 0.003 specific gravity while the fish is allowed to acclimate to each new environment for at least about one week per 0.0005 specific gravity increment.

In a more preferred embodiment, the fish is initially placed in water having a salt content about 1.011. Then, the salt content is reduced by about 0.001 approximately every two weeks.

One can stop the acclimation process at any desired intervening salt concentration. For example, one can acclimate the salt-water fish to fresh water or to water having a salt content of about 1.001 to about 1.003.

It is expected that this acclimation process is applicable to most salt-water fish. Exception may include the more primitive fish such as sharks, rays, coral or anemone. Preferred fish for the process include chromis, damsel, clown, tang, surgeon and grouper. Particularly preferred fish for this acclimation include *Chromis viridis, Chrysiptera starcki, Chrysiptera cyanea, Paraglyphidodon oxyodon, Pomacentrus coelestis, Premnas biaculeatus, Amphiprion leucokranos, Amphiprion percula, Amphiprion clarkii, Amphiprion ephippium, Amphiprion sebae, Dascyllus aruanus, Dascyllus trimaculatus, Dascyllus melanurus, Zebrasoma veliferum, Zebrasoma flavescens* and *Cromileptes altivelis.*

The pH of salt water is about 8.0 to about 8.4 while that of pure water is 7.0. The pH of natural fresh water is often less than 7.0 because of dissolved acidic solutes in the water. As one lowers the salt content, especially from about 1.003 down, the pH also drops. In order to keep the salt-water fish in good vigor, the pH of the water should be maintained at about 7.4 to about 7.5. This is accomplished by methods well-known in the art, such as by placing a dead coral in the aquarium to act as a natural buffer, or by adding small amount of sodium bicarbonate to the tank.

In all other respects, care of the salt-water fish is the same as if they were in salt water. A varied diet, maintaining the temperature at about 78° F., use of vitamins are examples of normal salt-water fish care.

In addition, when salt-water fish is introduced to an aquarium, one must equilibrate the temperature of the initial water holding the salt-water fish with the temperature of the aquarium water by methods known in the art. For the purposes of the invention, every time one introduces the salt-water fish to water having a different salt content, the temperature of the old water and the new water should be in equilibrium. As an example, when the salt-water fish is carried in a plastic bag to an aquarium, the bag is placed in the aquarium water for about 20 minutes before the contents of the bag is released into the aquarium.

The invention also provides a salt-water fish that can live in water that contains substantially less salt than its natural habitat. Preferably, the salt-water fish can live in fresh water or water having a salt content of about 1.001 to about 1.003.

Further, the invention provides the ability to keep both salt-water fish and fresh-water fish within the same aquarium.

I claim:

1. A process for acclimating a salt-water fish that is adaptable to acclimation to water that contains substantially less salt than its natural habitat, comprising:

a) placing a salt-water fish in water having, by specific gravity, about one half the salt content of its natural habitat; and b) then slowly reducing the salt content to the desired concentration.

2. The process of claim 1 wherein the salt content in step a) is about 1.012 to about 1.01; and the salt content in step b) is reduced by increments of about 0.0005 to about 0.003 specific gravity and the fish is acclimated to each new environment for at least about one week per 0.0005 specific gravity increment.

3. The process of claim 1 wherein the pH is maintained at about 7.4 to about 7.5 as the salt content approaches about 1.003.

4. The process of claim 1 wherein the salt content in step a) is about 1.011; and the salt content in step b) is reduced by about 0.001 approximately every two weeks.

5. The process of claim 1 wherein the salt content in step a) is about 1.011;

the salt content in step b) is reduced by about 0.001 approximately every two weeks; and the pH is maintained at about 7.4 to about 7.5 as the salt content approaches about 1.003.

6. The process of claim 1 wherein the salt-water fish is acclimated to fresh water.

7. The process of claim 1 wherein the salt-water fish is acclimated to water having a salt content of about 1.001 to about 1.003.

8. The process of claim 1, wherein the salt-water fish is selected from the group consisting of chromis, damsel, clown, tang, surgeon and grouper.

9. The process of claim 1, wherein the fish is selected from the group consisting of *Chromis viridis, Chrysiptera starcki, Chrysiptera cyanea, Paraglyphidodon oxyodon, Pomacentrus coelestis, Premnas biaculeatus, Amphiprion leucokranos, Amphiprion percula, Amphiprion clarkii, Amphiprion ephippium, Amphiprion sebae, Dascyllus aruanus, Dascyllus trimaculatus, Dascyllus melanurus, Zebrasoma veliferum, Zebrasoma flavescens* and *Cromileptes altivelis*.

* * * * *